United States Patent
Misumi et al.

(10) Patent No.: US 10,391,985 B2
(45) Date of Patent: Aug. 27, 2019

(54) ELECTRIC BRAKE CONTROL APPARATUS

(71) Applicants: TOYOTA JIDOSHA KABUSHIKI KAISHA, Toyota-shi, Aichi-ken (JP); ADVICS CO., LTD., Kariya-shi, Aichi-ken (JP)

(72) Inventors: Ryutaro Misumi, Toyota (JP); Naoki Yabusaki, Toyota (JP); Shinichiro Yukoku, Seto (JP); Satoshi Hirata, Obu (JP)

(73) Assignees: TOYOTA JIDOSHA KABUSHIKI KAISHA, Toyota-shi, Aichi-ken (JP); ADVICS CO., LTD., Kariya-shi, Aichi-Ken (JP)

( * ) Notice: Subject to any disclaimer, the term of this patent is extended or adjusted under 35 U.S.C. 154(b) by 0 days.

(21) Appl. No.: 15/816,228

(22) Filed: Nov. 17, 2017

(65) Prior Publication Data

US 2018/0148022 A1    May 31, 2018

(30) Foreign Application Priority Data

Nov. 28, 2016   (JP) ................. 2016-229816

(51) Int. Cl.
*B60T 8/17*    (2006.01)
*B60T 8/171*   (2006.01)
(Continued)

(52) U.S. Cl.
CPC ............. *B60T 8/171* (2013.01); *B60T 8/00* (2013.01); *B60T 8/17* (2013.01); *B60T 13/741* (2013.01);
(Continued)

(58) Field of Classification Search
CPC .......... B60T 13/741; B60T 8/00; B60T 8/171; B60T 8/172; F16D 65/18
(Continued)

(56) References Cited

U.S. PATENT DOCUMENTS

2002/0112927 A1*  8/2002  Giering ................. F16D 65/183
                                                  188/1.11 W
2006/0163939 A1*  7/2006  Kuramochi ............. B60T 8/885
                                                  303/122.04
(Continued)

FOREIGN PATENT DOCUMENTS

JP    4186969 B2    9/2008
JP    2009-067264 A    4/2009
JP    2015-085869 A    5/2015

*Primary Examiner* — Christopher P Schwartz
(74) *Attorney, Agent, or Firm* — Sughrue Mion, PLLC (57) ABSTRACT

An electric brake control apparatus includes: a clamping force acquisition unit configured to acquire a clamping force generated by moving a piston toward a pad through rotation of a motor; a lower-limit clamping force acquisition unit configured to acquire a minimum value of the clamping force required to maintain a stopped state of the rotor; an upper-limit clamping force acquisition unit configured to acquire a maximum value of the clamping force to move the piston away from the pad through a power of a power supply while maintaining the stopped state of the rotor, based on a state of a power supply; and a clamping force control unit configured to control the motor such that the clamping force is confined between the minimum value and the maximum value.

8 Claims, 5 Drawing Sheets

(51) Int. Cl.
*B60T 13/74* (2006.01)
*B60T 17/22* (2006.01)
*F16D 65/18* (2006.01)
*B60T 8/00* (2006.01)
*F16D 66/00* (2006.01)
*F16D 121/24* (2012.01)
*F16D 125/40* (2012.01)
*F16D 127/06* (2012.01)

(52) U.S. Cl.
CPC .......... *B60T 13/745* (2013.01); *B60T 13/746* (2013.01); *B60T 17/221* (2013.01); *F16D 65/18* (2013.01); *F16D 65/183* (2013.01); *F16D 66/00* (2013.01); *F16D 2066/005* (2013.01); *F16D 2121/24* (2013.01); *F16D 2125/40* (2013.01); *F16D 2127/06* (2013.01)

(58) Field of Classification Search
USPC ..... 188/1.11 E, 72.6–72.8, 156–164; 701/22, 701/70; 303/3, 7, 15, 20
See application file for complete search history.

(56) References Cited

U.S. PATENT DOCUMENTS

| | | | | |
|---|---|---|---|---|
| 2007/0052289 A1* | 3/2007 | Nilsson | ................... | B60T 8/885 303/20 |
| 2007/0126281 A1* | 6/2007 | Zumberge | ............. | B60T 13/741 303/3 |
| 2008/0048596 A1* | 2/2008 | Konishi | ................... | B60T 7/042 318/372 |
| 2008/0121469 A1* | 5/2008 | Maron | ................... | B60T 13/741 188/1.11 E |
| 2008/0196529 A1 | 8/2008 | Sugitani | | |
| 2010/0082213 A1* | 4/2010 | Taylor | ..................... | B60T 13/04 701/76 |
| 2010/0294602 A1* | 11/2010 | Gustafsson | ........... | B60T 13/746 188/158 |
| 2011/0295478 A1* | 12/2011 | Jeon | ........................ | B60T 7/107 701/70 |
| 2013/0211684 A1* | 8/2013 | Baehrle-Miller | ....... | B60T 7/107 701/70 |
| 2013/0226423 A1* | 8/2013 | Baehrle-Miller | ......... | B60T 7/12 701/70 |
| 2014/0214296 A1* | 7/2014 | Baehrle-Miller | ..... | B60T 11/046 701/70 |
| 2014/0222307 A1* | 8/2014 | Richter | ................... | B60T 7/108 701/70 |
| 2015/0120163 A1* | 4/2015 | Ohara | ................... | B60T 13/662 701/70 |
| 2015/0191159 A1* | 7/2015 | Akamine | ............... | B60T 8/1755 701/22 |
| 2015/0217738 A1* | 8/2015 | Blattert | ................. | B60T 13/662 701/70 |
| 2015/0246662 A1* | 9/2015 | Masuda | ................... | B60T 7/085 701/70 |
| 2015/0300433 A1* | 10/2015 | Yasui | ..................... | F16D 65/18 188/162 |

* cited by examiner

ELECTRIC BRAKE CONTROL APPARATUS

INCORPORATION BY REFERENCE

The disclosure of Japanese Patent Application No. 2016-229816 filed on Nov. 28, 2016 including the specification, drawings and abstract is incorporated herein by reference in its entirety.

BACKGROUND

1. Technical Field

The disclosure relates to an electric brake control apparatus.

2. Description of Related Art

There is known an electric brake device for a vehicle that brakes rotation of a wheel by moving a piston through rotation of a motor and pressing a brake pad against a brake rotor. This electric brake device is mounted with a linear motion conversion mechanism that converts rotary motions of the motor resulting from a current controlled by an electric brake control apparatus into linear motions of the piston. When the electric brake device brakes the wheel, a frictional force is generated between the brake rotor and the brake pad. As a result, the temperatures of the brake rotor and the brake pad may become high, and the brake rotor and the brake pad may thermally expand. In a state where the temperatures of these members are high, when the vehicle is stopped for a long time with the electric brake device in operation, the members whose temperatures are high may be cooled to thermally contract, and the clamping force of the electric brake device may decrease. To prevent this phenomenon, Japanese Patent Application Publication No. 2015-085869 (JP 2015-085869 A) discloses an electric brake control apparatus that estimates a temperature of a brake rotor and that sets a target clamping force based on the estimated temperature. Besides, Japanese Patent Application Publication No. 2009-067264 (JP 2009-067264 A) discloses an electric brake control apparatus that estimates a temperature of a brake pad at intervals of a certain time and that controls a clamping force in accordance with the estimated temperature.

SUMMARY

In the electric brake device as described above, with the vehicle stopped for a long time, the clamping force of the electric brake device may change due to thermal contraction of members such as the brake pad and the like. This thermal contraction may occur not only in the brake rotor and brake pad where heat induced by friction is generated in braking the wheel, but also in members to which the heat of the brake rotor and the brake pad is transferred, for example, a caliper. When the brake rotor and the brake pad thermally contract, the clamping force of the electric brake device decreases. When the caliper thermally contracts, the clamping force of the electric brake device increases.

The amount of thermal contraction of the caliper may be larger than the amounts of thermal contraction of the brake rotor and the brake pad. Besides, the reverse efficiency of the linear motion conversion mechanism of the electric brake device is set low. When the vehicle is stopped for a long time, an input gear of the linear motion conversion mechanism is locked and hence cannot be rotated. Thus, when the vehicle is stopped for a long time, the position of the piston is maintained. Therefore, as the caliper thermally contracts, the clamping force increases and may become larger than the clamping force at the time when the vehicle is stopped. When the clamping force increases, the frictional force that is generated in a region of contact between gears of the linear motion conversion mechanism of the electric brake device increases. Thus, the power that is needed to rotate the motor in canceling the operation of the electric brake device may become large. When the power that is needed to cancel the operation of the electric brake device exceeds the power stored in a power supply, the braking by the electric brake device cannot be canceled. Accordingly, when the vehicle is stopped, it is preferable to take a measure against an increase in the clamping force as well as a conventional measure against a decrease in the clamping force.

The disclosure provides an electric brake control apparatus that prevents a clamping force from increasing beyond necessity.

One aspect of the disclosure provides an electric brake control apparatus including: a clamping force acquisition unit that is configured to acquire a clamping force, the clamping force being a force generated by moving a piston toward a pad through rotation of a motor in a first rotational direction to press the pad against a rotor; a lower-limit clamping force acquisition unit that is configured to acquire a lower-limit clamping force, the lower-limit clamping force being a minimum value of the clamping force required to maintain a stopped state of the rotor; an upper-limit clamping force acquisition unit that is configured to acquire, based on a state of a power supply, an upper-limit clamping force, the upper-limit clamping force being a maximum value of the clamping force that is enough to move the piston away from the pad through a power of the power supply while maintaining the stopped state of the rotor; and a clamping force control unit that is configured to control the motor such that the clamping force acquired by the clamping force acquisition unit is confined between the lower-limit clamping force and the upper-limit clamping force.

According to the aforementioned aspect of the disclosure, as soon as the rotor is stopped, the clamping force is monitored. When the clamping force changes, the motor is controlled, so that the clamping force is confined between the lower-limit clamping force and the upper-limit clamping force. Thus, the rotor can be prevented from becoming rotatable for the reason that the clamping force drops below the lower-limit clamping force, and the piston can be prevented from becoming incapable of moving away from the pad for the reason that the clamping force exceeds the upper-limit clamping force.

In the above aspect, the clamping force acquisition unit may include a load sensor configured to detect, as the clamping force, a force that is applied to the piston from the pad when the pad is pressed against the rotor through rotation of the motor in the first rotational direction.

Owing to the aforementioned configuration, the clamping force is detected by the load sensor. Thus, the clamping force can be detected with higher accuracy than in the case where, for example, the clamping force is estimated from the amounts of thermal expansion of the rotor and the pad.

In the aforementioned aspect, the load sensor may be supported by a caliper that supports the pad, the force applied to the piston from the pad may be transmitted to the load sensor from the piston via a linear motion conversion mechanism, and the linear motion conversion mechanism may be equipped with a first member and a second member, the first member being configured to be rotated by the motor, and the second member being configured to move the piston by moving toward or away from the pad through rotation of the first member.

Owing to the configuration as described above, when the pad is pressed against the rotor, the force that is applied to the piston from the pad is transmitted to the load sensor from the piston via the second member and the first member. After that, the force transmitted to the load sensor is transmitted to the pad via the caliper. That is, the load sensor is arranged at a non-end portion of a transmission path of the force that is applied to the piston from the pad.

Besides, in the aforementioned aspect of the disclosure, the second member may be configured not to move relatively to the first member in a state where no power is supplied to the motor from the power supply.

Owing to the configuration as described above, when the motor is stopped from being supplied with power and the first member does not rotate, the position of the piston is maintained. In this manner, when the caliper thermally contracts with the motor stopped from being supplied with power, the force that is applied to the first member from the caliper via the load sensor increases. At this time, the second member does not move relatively to the first member, so the clamping force increases by a value corresponding to contraction of the caliper. By detecting this increase in the clamping force with the aid of the load sensor, the clamping force can be restrained from increasing. When the clamping force increases, the frictional force that is generated between the first member and the second member increases, and the first member becomes unlikely to rotate. When the motor is supplied with a current and the first member is rotated to move the second member away from the pad with the clamping force having increased, it may become impossible to rotate the first member in the case where the power that is needed to rotate the first member is not stored in the power supply. To prevent this circumstance from arising, the clamping force is restrained from increasing.

Besides, in the aforementioned aspect of the disclosure, the upper-limit clamping force acquisition unit may be configured to acquire the upper-limit clamping force based on an amount of power stored by the power supply.

Owing to the configuration as described above, the upper-limit clamping force that allows the first member to rotate with the current amount of power is determined from the amount of power stored by the power supply. Thus, the piston is prevented from becoming incapable of moving away from the pad through rotation of the first member due to an insufficient amount of power.

Besides, in the aforementioned aspect of the disclosure, the upper-limit clamping force acquisition unit may be configured to acquire the upper-limit clamping force that is larger when an amount of power stored by the power supply is large than when the amount of power stored by the power supply is small.

Owing to the configuration as described above, the upper-limit clamping force increases in proportion to the amount of power stored by the power supply. Therefore, the upper-limit clamping force can be estimated by detecting the amount of power of the power supply.

By controlling the clamping force such that the clamping force is confined between the lower-limit clamping force and the upper-limit clamping force with the rotor stopped, the maintenance of the stopped state of the rotor can be prevented from becoming impossible, and the movement of the piston away from the pad can be prevented from becoming impossible.

In the aforementioned aspect, the electric brake control apparatus may include a detection sensor configured to detect an activation of a parking brake. The electric brake control apparatus may be configured to stop acquisition of the lower-limit clamping force by the lower-limit clamping force acquisition unit, acquisition of the upper-limit clamping force by the upper-limit clamping force acquisition unit, and performance of control of the motor by the clamping force control unit, after a predetermined period from the activation of the parking brake.

In the aforementioned aspect, the clamping force control unit may be configured to release a lock mechanism while controlling the motor. The lock mechanism may be configured to activate through the activation of the parking brake, and, to keep the piston from moving away from the pad.

BRIEF DESCRIPTION OF THE DRAWINGS

Features, advantages, and technical and industrial significance of an exemplary embodiment of the disclosure will be described below with reference to the accompanying drawings, in which like numerals denote like elements, and wherein.

DETAILED DESCRIPTION OF EMBODIMENT

A mode for carrying out the disclosure will be described hereinafter in detail based on the drawings.

Figure 1:
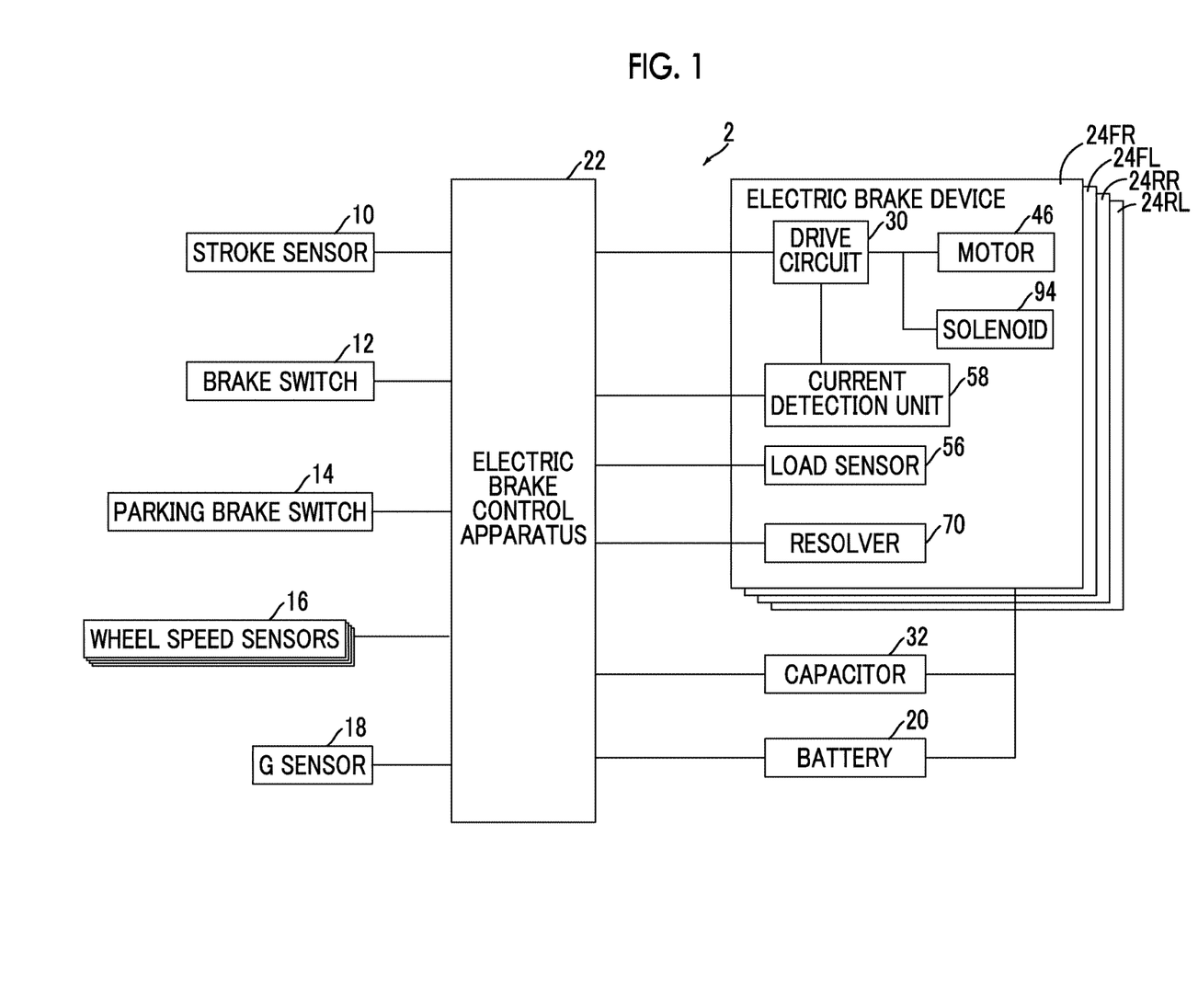
FIG. 1 is a schematic view showing the general configuration of a brake system to which an electric brake control apparatus according to the first embodiment of the disclosure is applied.

FIG. 1 is a schematic view showing the general configuration of an electric brake system 2 to which an electric brake control apparatus 22 according to the first embodiment of the disclosure is applied. As shown in FIG. 1, the electric brake system 2 is equipped with a brake pedal (not shown), a stroke sensor 10, a brake switch 12, a parking brake switch 14, wheel speed sensors 16, a G sensor 18, a battery 20, the electric brake control apparatus 22, a capacitor 32, and electric brake devices 24. The wheel speed sensors 16 and the electric brake devices 24 are provided on wheels of a vehicle respectively. The front-right wheel, the front-left wheel, the rear-right wheel, and the rear-left wheel of the vehicle are provided with the electric brake devices 24FR, 24FL, 24RR, and 24RL respectively. The electric brake devices 24FR, 24FL, 24RR, and 24RL are identical in configuration to one another. Therefore, the electric brake device 24FR will be described herein.

The stroke sensor 10 detects an operation amount of a brake pedal. The brake switch 12 detects an operation of a service brake by a passenger, and outputs an ON signal when the operation of the service brake is detected. The parking brake switch 14 detects an operation of a parking brake by the passenger, and outputs an ON signal when the operation of the parking brake is detected. The wheel speed sensors 16 are attached to the wheels of the vehicle respectively, and detect rotational speeds of the wheels respectively. The G sensor 18 is an acceleration sensor, and detects a gradient of the vehicle by detecting accelerations in three directions, namely, a longitudinal direction, a lateral direction, and a vertical direction. The battery 20 is a power supply of the electric brake system 2, and is connected to the electric brake control apparatus 22 and the electric brake devices 24. A voltage of the battery 20 is detected by the electric brake control apparatus 22. The capacitor 32 is an auxiliary power supply of the electric brake device 24FR, and is connected to the electric brake control apparatus 22 and the electric brake devices 24. A voltage of the capacitor 32 is detected by the electric brake control apparatus 22.

The electric brake control apparatus 22 is equipped with a CPU, a ROM, an EEPROM, a RAM, a communication interface, and the like. The electric brake control apparatus 22 performs various kinds of control through the execution of a program stored in the ROM by the CPU. The electric brake control apparatus 22 supplies a current to a later-described motor 46 of each of the electric brake devices 24 via a drive circuit 30. The current supplied to the motor 46 and a rotational angle of the motor 46 are detected by a current detection unit 58 and a resolver 70. The stroke sensor 10, the brake switch 12, the parking brake switch 14, the wheel speed sensors 16, the G sensor 18, the battery 20, the drive circuit 30, the capacitor 32, the resolver 70, a load sensor 56, the current detection unit 58, and a solenoid 94 are connected to the electric brake control apparatus 22. The drive circuit 30, the capacitor 32, the resolver 70, the load sensor 56, the current detection unit 58, and the solenoid 94 will be described later.

Figure 2:
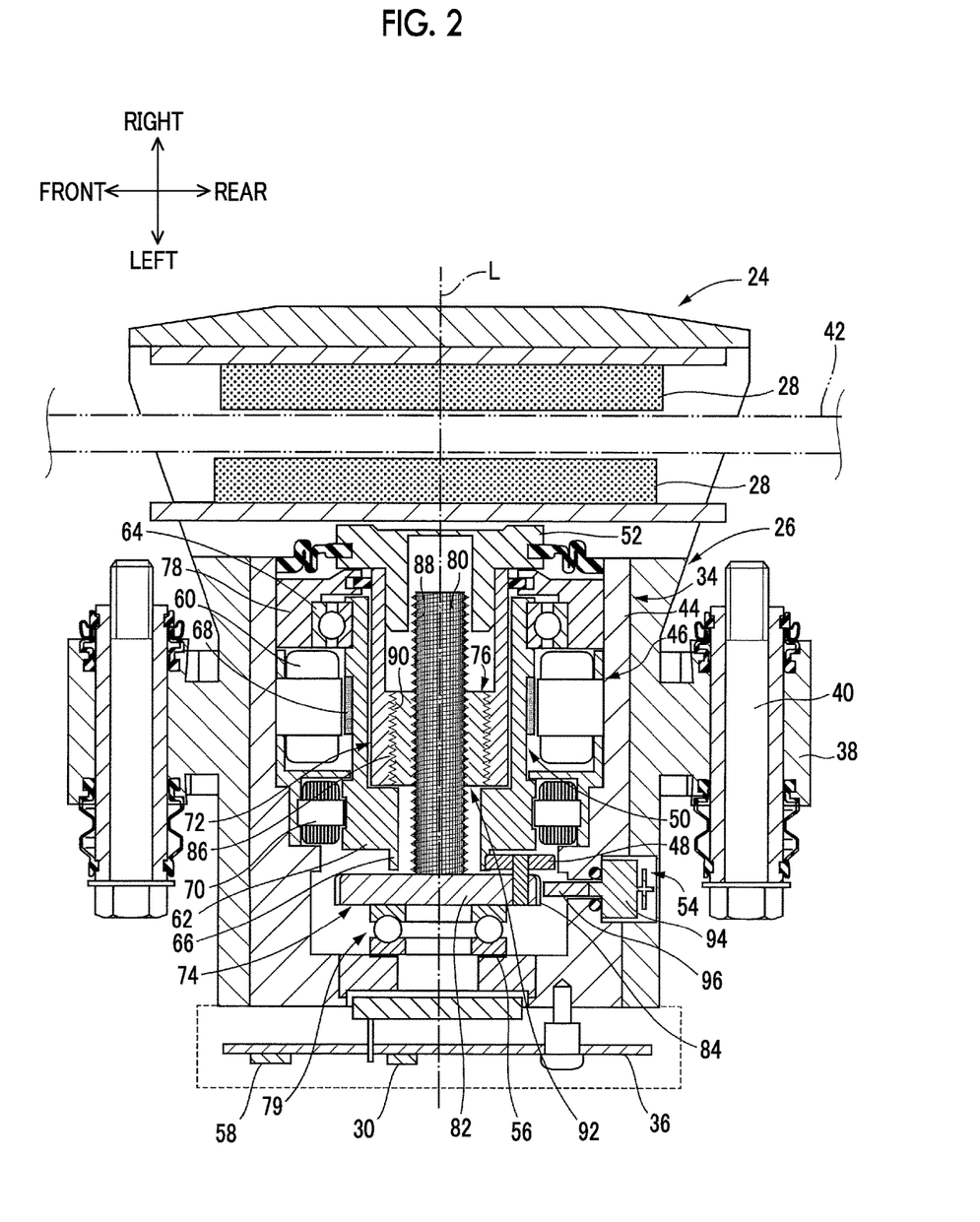
FIG. 2 is a cross-sectional view of an electric brake device according to the first embodiment of the disclosure.

FIG. 2 is a cross-sectional view of the electric brake device 24FR taken along a horizontal plane. In FIG. 2, the longitudinal direction of the electric brake device 24FR is prescribed with respect to a traveling direction of the vehicle, and the lateral direction of the electric brake device 24FR is prescribed in such a manner as to correspond to a vehicle width direction of the vehicle. As shown in FIG. 2, the electric brake device 24 is equipped with a caliper 26, brake pads 28, the drive circuit 30, a piston drive device 34, and a control substrate 36. The caliper 26 is provided with sliders 38 as cylindrical members having axes parallel to the lateral direction. A pair of guide pins 40 that are supported on a vehicle body side are inserted in inner peripheral portions of the sliders 38 respectively. The pair of the guide pins 40 are parallel to the lateral direction, and the sliders 38 are formed slidably along outer peripheral surfaces of the pair of the guide pins 40 respectively. That is, the caliper 26 is attached movably in the lateral direction with respect to the vehicle body. The brake pads 28 are held by the caliper 26, and clamps a brake rotor 42, which rotates together with the wheel, in the lateral direction. The drive circuit 30 supplies a current to the later-described motor 46 in accordance with a command that is transmitted from the electric brake control apparatus 22, and drives the motor 46.

The piston drive device 34 is equipped with a housing 44, the motor 46, a speed reduction gear 48, a linear motion conversion mechanism 50, a piston 52, a brake lock mechanism 54, and the load sensor 56. The housing 44 is fixed to an inner peripheral portion of the caliper 26. The motor 46 is arranged on an inner peripheral portion of the housing 44. The motor 46 includes a plurality of coils 60 that are disposed on an inner peripheral surface of the housing 44 in a circumferential direction thereof, and a rotator 62 that is provided inside the plurality of the coils 60. The rotator 62 is a cylindrical member, and is arranged such that an axis L as a central axis of the rotator 62 extends parallel to the lateral direction. The rotator 62 is supported rotatably with respect to the housing 44, by a bearing 64 that is fixed to a later-described support portion 78. A plurality of flat teeth 66 are formed at a left end portion of an outer peripheral surface of the rotator 62. A plurality of magnets 68 that are opposed to the plurality of the coils 60 respectively are disposed to the right of the plurality of the flat teeth 66 on the outer peripheral surface of the rotator 62, in the circumferential direction. In the motor 46, the rotator 62 and the magnets 68 function as a rotor, so the rotator 62 rotates around the axis L. A rotational angle of the rotator 62 is detected by the resolver 70 that is fixed to the inner peripheral surface of the housing 44.

The speed reduction gear 48 reduces the speed of rotation of the rotator 62, and transmits the rotation to a flange portion 82. The speed reduction gear 48 is equipped with a gear portion on which flat teeth meshing with the plurality of the flat teeth 66 of the rotator 62 respectively are formed, and a rotary shaft that penetrates a central portion of the gear portion. The gear portion is formed rotatably around the rotary shaft, and the rotary shaft is fixed to a right lateral surface of the later-described flange portion 82. The gear portion of the speed reduction gear 48 meshes with the plurality of the flat teeth 66, so the speed reduction gear 48 is rotated as the rotator 62 rotates. At this moment, the speed reduction gear 48 rotates along an outer peripheral portion of the rotator 62 while rotating around its own axis, reduces the speed of rotation of the rotator 62, and transmits the rotation to the flange portion 82. The number of teeth of the gear portion of the speed reduction gear 48 is set smaller than the number of the plurality of the flat teeth 66. Therefore, the speed reduction ratio between the speed reduction gear 48 and the rotator 62 is large, and a low-torque compact motor can be adopted as the motor 46.

The linear motion conversion mechanism 50 converts rotary motions of the motor 46 into linear motions of the piston 52. The linear motion conversion mechanism 50 is provided at an inner peripheral portion of the rotator 62 of the motor 46, and includes an output cylinder 72, an input shaft 74, and a plurality of planetary rollers 76. The output cylinder 72 is provided inside the rotator 62 such that an axis of the output cylinder 72 coincides with the axis L. An outer peripheral surface of the output cylinder 72 is supported by the support portion 78, so the output cylinder 72 is supported slidably in the lateral direction with respect to the housing 44. A central portion of the support portion 78 is annularly formed. An outer peripheral portion of the support portion 78 extends parallel to the lateral direction, and is fixed to the inner peripheral surface of the housing 44. A space between an inner peripheral portion of the support portion 78 and the output cylinder 72 is sealed by a sealing member. A piston 52 is fitted in an inner peripheral portion of a right end portion of the output cylinder 72, and the output cylinder 72 and the piston 52 move integrally with each other. Therefore, the piston 52 can move in the lateral direction with respect to the housing 44. When moving rightward, the piston 52 moves toward the brake pads 28. When moving leftward, the piston 52 moves away from the brake pads 28.

The input shaft 74 is arranged at the inner peripheral portion of the output cylinder 72, and is supported rotatably around the axis L with respect to the housing 44, by a thrust bearing 79. The input shaft 74 is arranged such that an axis of rotation thereof coincides with the axis L, and is equipped with a shaft portion 80 that is arranged inside the output cylinder 72, and the flange portion 82 that is fixed to a left end of the shaft portion 80. The flange portion 82 is a ratchet gear having an outer peripheral surface on which a plurality of saw teeth 84 are formed. The rotary shaft of the speed reduction gear 48 is fixed to the right lateral surface of the flange portion 82. The flange portion 82 is configured to rotate as the speed reduction gear 48 rotates around the rotator 62. The plurality of the planetary rollers 76 are arranged between the input shaft 74 and the output cylinder 72. Each of the plurality of the planetary rollers 76 is held rotatably around its own axis by a carrier (not shown) that is supported by the output cylinder 72.

An output thread portion 86, an input thread portion 88, and planetary thread portions 90 are formed in the inner peripheral portion of the output cylinder 72, an outer peripheral portion of the input shaft 74, and outer peripheral portions of the plurality of the planetary rollers 76, respectively. The output thread portion 86, the input thread portion 88, and the planetary thread portions 90 are screwed to one another to form a thread-like gear mechanism 92. The thread-like gear mechanism 92 according to the present embodiment of the disclosure is configured such that a thread streak number ratio and a thread effective diameter ratio are equal to each other between the output thread portion 86 and each of the planetary thread portions 90, and that the thread streak number ratio and the thread effective diameter ratio are different from each other between the input thread portion 88 and each of the planetary thread portions 90. Therefore, the output cylinder 72 and the plurality of the planetary rollers 76 move in the axial direction relatively to the input shaft 74. At this time, the plurality of the planetary rollers 76 do not move in the axial direction relatively to the output cylinder 72. Accordingly, when the input shaft 74 rotates as the motor 46 rotates, the output cylinder 72 and the planetary rollers 76 move in the axial direction relatively to the input shaft 74, and the piston 52 is moved. Incidentally, the details of the linear motion conversion mechanism 50 are described in Registered U.S. Pat. No. 4,186,969.

The brake lock mechanism 54 prohibits the piston 52 from moving after having moved the piston 52 toward the brake pads 28. The brake lock mechanism 54 is equipped with the solenoid 94 and a lock pin 96. The solenoid 94 is fixed to the caliper 26, and is connected to the electric brake control apparatus 22 as shown in FIG. 1. By being supplied with a current from the electric brake control apparatus 22, the solenoid 94 moves the lock pin 96, which is attached to a movable iron core thereof. The lock pin 96 is a ratchet pawl whose tip is formed in a shape corresponding to the plurality of the saw teeth 84 of the flange portion 82. The lock pin 96 penetrates the housing 44, and protrudes toward the flange portion 82.

When no current is supplied to the solenoid 94, the lock pin 96 is urged toward the flange portion 82 by a spring (not shown), and a tip of the lock pin 96 is engaged with the plurality of the saw teeth 84. Thus, the flange portion 82 is prohibited from rotating. That is, the piston 52 is prohibited from moving away from the brake pads 28. When a current is supplied to the solenoid 94, the lock pin 96 is moved away from the flange portion 82, and the tip of the lock pin 96 is spaced apart from the plurality of the saw teeth 84. That is, the flange portion 82 can rotate through the supply of the current to the solenoid 94. In consequence, even when a force is applied to the piston 52 from the brake pads 28 with the lock pin 96 engaged with the flange portion 82 and with no current supplied to the motor 46, the output cylinder 72 and the planetary rollers 76 do not move relatively to the input shaft 74. Accordingly, at this time, the piston 52 is not moved either.

The load sensor 56 is provided on an inner surface of a left end of the housing 44. Part of the load sensor 56 is arranged in such a manner as to be located between the thrust bearing 79 and the housing 44. When the brake pads 28 are pressed against the brake rotor 42 through the movement of the piston 52, the force that is applied to the piston 52 from the brake pads 28 is transmitted to the load sensor 56 via the output cylinder 72, the planetary rollers 76, the input shaft 74, and the thrust bearing 79. Accordingly, a clamping force of the electric brake device 24 can be detected based on a value of the load sensor 56 at the time when the brake pads 28 are pressed against the brake rotor 42. For example, a strain gauge that detects, as a load, an amount of deformation of the inner surface of the left end of the housing 44 when a force is applied to the inner surface of the left end of the housing 44 from the thrust bearing 79 can be mentioned as the load sensor 56. A signal output by the load sensor 56 is input to the electric brake control apparatus 22.

The control substrate 36 is fixed to a left end portion of the caliper 26, and supports the drive circuit 30 and the current detection unit 58. The drive circuit 30 receives a signal that is output to the motor 46 from the electric brake control apparatus 22, and supplies a current to the motor 46 based on the signal. The current detection unit 58 detects a value of the current that is supplied to the motor 46 from the drive circuit 30, and outputs a detection signal to the electric brake control apparatus 22.

⟨Service Brake Operation of Electric Brake Device 24⟩

When the brake pedal is depressed by the passenger, the brake switch 12 outputs an ON signal to the electric brake control apparatus 22. First of all, a current is supplied to the solenoid 94 to disengage the lock pin 96 from the flange portion 82. Subsequently, the electric brake control apparatus 22 supplies a current to the motor 46 via the drive circuit 30, in accordance with an operation amount of the brake pedal detected by the stroke sensor 10. Thus, the motor 46 is driven, and rotates the rotator 62 in a first rotational direction, namely, a rotational direction at the time when the piston 52 is moved toward the brake pads 28. The speed reduction gear 48 rotates as the rotator 62 rotates in the first rotational direction. The speed reduction gear 48 reduces the speed of rotation of the rotator 62, and transmits the rotation to the flange portion 82. When the input shaft 74 rotates as the flange portion 82 rotates, the plurality of the planetary rollers 76 and the output cylinder 72 move toward the brake pads 28 with the aid of the thread-like gear mechanism 92. The piston 52 moves toward the brake pads 28 integrally with the output cylinder 72, and is pressed against the brake pads 28. An axial force of the piston 52 is applied to the brake pads 28, so the brake pads 28 move toward the brake rotor 42. When the brake pads 28 press the brake rotor 42, rotation of the wheel is braked.

After that, when the brake pedal is returned, the brake switch 12 outputs an OFF signal to the electric brake control apparatus 22. Subsequently, the motor 46 is driven by the electric brake control apparatus 22, and the rotator 62 is rotated in a second rotational direction, namely, the opposite direction of the first rotational direction. The speed of rotation of the rotator 62 is reduced by the speed reduction gear 48, and this rotation is transmitted to the flange portion 82, so the input shaft 74 rotates in the opposite direction. Thus, the planetary rollers 76 and the output cylinder 72 move away from the brake pads 28, and the piston 52 is detached from the brake pads 28. At this time, the brake pads 28 are also detached from the brake rotor 42, and the braking of rotation of the wheel is canceled.

⟨Parking Brake Operation of Electric Brake Device 24⟩

When the parking brake is operated by the passenger, the parking brake switch 14 outputs an ON signal to the electric brake control apparatus 22. Subsequently, the electric brake control apparatus 22 calculates a target clamping force that is needed to maintain a stopped state of the brake rotor 42. Then, the electric brake control apparatus 22 moves the piston 52 toward the brake pads 28 to a target position that is needed to generate the calculated target clamping force, by rotating the motor 46 in the first rotational direction. After having moved the piston 52 to the target position, the electric brake control apparatus 22 stops supplying a current to the solenoid 94, and engages the lock pin 96 with the flange portion 82. Thus, the piston 52 is fixed in such a manner as not to move relatively to the housing 44.

When the operation of the parking brake is canceled by the passenger, the parking brake switch 14 outputs an OFF signal to the electric brake control apparatus 22. Subsequently, the electric brake control apparatus 22 supplies a current to the solenoid 94, and disengages the lock pin 96 from the flange portion 82. Subsequently, the electric brake control apparatus 22 supplies a current to the motor 46, and rotates the motor 46 in the second rotational direction. Thus, the piston 52 is moved away from the brake pads 28, the brake pads 28 are detached from the brake rotor 42, and the braking of the wheel is canceled.

A clamping force is a force that is applied to the brake rotor 42 through the pressing of the brake pads 28 against the brake rotor 42. That is, the clamping force can also be regarded as a force that is applied to the brake rotor 42 from the brake pads 28, which are located on both right and left sides of the brake rotor 42 respectively, and that restrains rotation of the brake rotor 42. The clamping force is transmitted to the linear motion conversion mechanism 50 via the brake pads 28 and the piston 52, and is detected by the load sensor 56. A target clamping force is calculated by adding, if necessary, a correction amount for thermal expansion of the electric brake device 24 to a basic clamping force, which is a force that is sufficient to keep the brake rotor 42 from rotating due to an external force. The basic clamping force is calculated from a gradient of a road surface on which the vehicle is stopped as detected by the G sensor 18. For example, a larger clamping force is needed when the gradient of the road surface on which the vehicle is stopped is large than when the gradient of the road surface on which the vehicle is stopped is small. Therefore, the basic clamping force is set large when the gradient of the road surface on which the vehicle is stopped is large.

A method of obtaining the correction amount for thermal expansion of the electric brake device 24 will be described hereinafter. When the brake pads 28 are pressed against the brake rotor 42, heat is generated between the brake pads 28 and the brake rotor 42 due to a frictional force. Thus, the temperatures of the brake pads 28, the brake rotor 42, and peripheral members thereof become high. As a result, the brake pads 28, the brake rotor 42, the caliper 26 and the like thermally expand. When the parking brake operation is performed with the brake pads 28 having thermally expanded, the brake pads 28 that have been cooled by outside air afterward thermally contract, so the clamping force may decrease. Accordingly, the correction amount for thermal expansion of the brake pads 28 needs to be added to the basic clamping force in advance so that the stopped state of the brake rotor 42 can be maintained even when the clamping force decreases. When the amount of thermal expansion of the brake pads 28 is large, the amount of decrease in the clamping force resulting from thermal contraction is also large. Therefore, the correction amount for thermal expansion of the brake pads 28 is set larger when the amount of thermal expansion of the brake pads 28 is large than when the amount of thermal expansion of the brake pads 28 is small.

A method of estimating the amount of thermal expansion of the brake pads 28 will be described hereinafter. The amount of thermal expansion of the brake pads 28 can be calculated based on (i) an estimated temperature of the brake pads 28 and (ii) changes in a braking start position of the piston 52 and a braking end position of the piston 52. (i) The estimation of the temperature of the brake pads 28 will now be described. The heat generated by a work of the pressing of the brake rotor 42 by the brake pads 28 is stored into the brake pads 28 or discharged into the atmosphere from the brake rotor 42 and the like. The temperature of the brake pads 28 is estimated from a difference between an amount of heat generated by the electric brake device 24 and an amount of heat discharged by the electric brake device 24 at the time of braking and the absence of braking during normal running. A process of estimating the temperature of the brake pads 28 is repeatedly performed at intervals of a predetermined period. The amount of heat generated by the electric brake device 24 is proportional to an average energization current of the motor 46 within the predetermined period, and the amount of heat discharged by the electric brake device 24 is proportional to an average speed of the wheel within the predetermined period.

The electric brake control apparatus 22 acquires an energization current of the motor 46 and speeds of the wheels within the predetermined period, based on signals of the current detection unit 58 and the wheel speed sensors 16 respectively, and calculates an average energization current and an average speed. Subsequently, the electric brake control apparatus 22 calculates an amount of heat generation and an amount of heat discharge, obtains a difference between the calculated amount of heat generation and the calculated amount of heat discharge, and estimates a current temperature TP of the brake pads 28. Every time the process of estimating the temperature of the brake pads 28 is repeated, the current temperature TP is updated. Upon detecting the operation of the parking brake, the electric brake control apparatus 22 calculates an amount of thermal expansion of the brake pads 28 from a latest estimated temperature TPc of the brake pads 28 and a thermal expansion coefficient of the brake pads 28.

(ii) The detection of the braking start position of the piston 52 and the braking end position of the piston 52 will now be described. The braking start position of the piston 52 is a position of the piston 52 at the time when a clamping force is generated through the pressing of the brake pads 28 against the brake rotor 42. The braking operation is performed many times during the running of the vehicle, so the brake pads 28 are abraded, and the moving distance that is covered by the brake pads 28 before coming into abutment on the brake rotor 42 becomes long. The braking start position of the piston 52 is detected to detect an increase in this moving distance. A position where the brake pads 28 abut on the brake rotor 42 is detected depending on whether or not the value of the load sensor 56 has exceeded a predetermined value. The process of detecting the braking start position of the piston 52 and the braking end position of the piston 52 is carried out every time the brake is operated during normal running. When braking is started during normal running, the electric brake control apparatus 22 supplies a current to the motor 46, moves the piston 52 from an initial position thereof toward the brake pads 28, and determines a braking start position PS from a moving distance $S_1$ that is covered by the piston 52 until the value of the load sensor 56 exceeds a threshold.

Incidentally, the electric brake control apparatus 22 stores a maximum braking start position PSmax, namely, the braking start position PS that is spaced furthest apart from the initial position, compares the braking start position PS and the maximum braking start position PSmax with each other, and determines whether the braking start position PS or the maximum braking start position PSmax should be adopted. When the value of the braking start position PS is smaller than the value of the maximum braking start position PSmax, the maximum braking start position PSmax is adopted. When the value of the braking start position PS is larger than the value of the maximum braking start position PSmax, the braking start position PS is adopted, and this value is stored again as the maximum braking start position PSmax.

Subsequently, when braking is ended during normal running, the electric brake control apparatus 22 moves the piston 52 away from the brake pads 28, and determines a braking end position PE from a moving distance $S_2$ that is covered by the piston 52 before reaching the initial position thereof since when the value of the load sensor 56 drops below the threshold. The braking end position PE is updated every time the process of detecting the braking end position is carried out. A difference ΔP between the maximum braking start position PSmax and the braking end position PE results from thermal expansion of the brake pads 28. Upon detecting the operation of the parking brake, the electric brake control apparatus 22 calculates an amount of thermal expansion referring to a difference ΔPc between the maximum braking start position PSmax and a latest braking end position PEc.

Figure 3:
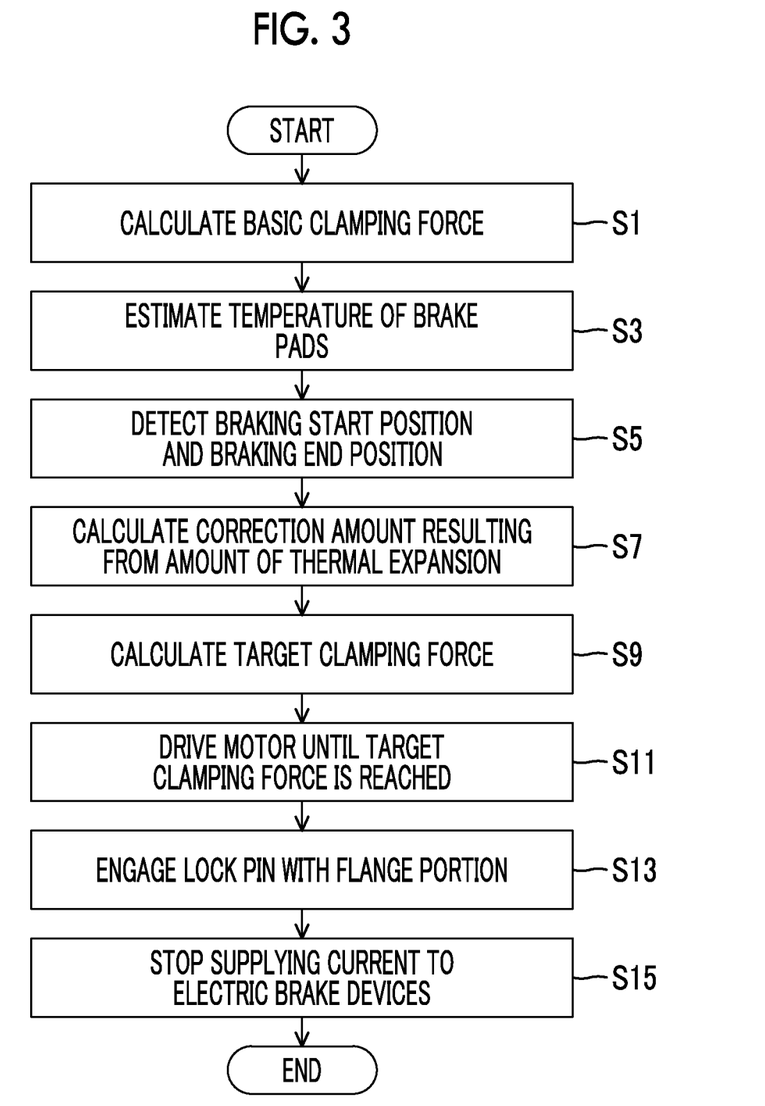
FIG. 3 is a view showing a processing procedure that is carried out by the electric brake control apparatus according to the first embodiment of the disclosure when the operation of a parking brake is started.

FIG. 3 is a flowchart showing a parking brake processing procedure that is carried out by the electric brake control apparatus 22. After detecting the operation of the parking brake by the passenger, the electric brake control apparatus 22 starts the processing procedure according to the flowchart. In step 1 (hereinafter abbreviated as "S1" as is the case with the other steps), the electric brake control apparatus 22 calculates a basic clamping force from a gradient of the vehicle based on a signal of the G sensor 18. Subsequently in S3, the electric brake control apparatus 22 carries out the estimation of a temperature of the above-mentioned brake pads 28, and calculates an amount of thermal expansion of the brake pads 28. Subsequently in S5, the electric brake control apparatus 22 carries out the detection of a braking start position of the piston 52 and a braking end position of the piston 52, and calculates an amount of thermal expansion of the brake pads 28. In S7, the electric brake control apparatus 22 compares the amounts of thermal expansion calculated in S3 and S5 with each other, adopts a result corresponding to the larger one of the amounts of thermal expansion, and calculates a correction amount of a clamping force for thermal expansion.

In S9, the electric brake control apparatus 22 adds the correction amount for thermal expansion of the brake pads 28 calculated in S7 to the basic clamping force calculated in S1, and calculates a target clamping force. In S11, the electric brake control apparatus 22 rotates the motor 46 in the first rotational direction, and moves the piston 52 toward the brake pads 28 until the value of the load sensor 56 becomes equal to the same magnitude as the target clamping force calculated in S9. Subsequently in S13, the electric brake control apparatus 22 stops supplying a current to the solenoid 94, and engages the lock pin 96 with the flange portion 82. Thus, the position of the piston 52 is fixed, and the parking brake is operated. After that, in S15, the electric brake control apparatus 22 stops supplying the current to each of the electric brake devices 24.

When the parking brake is operated as described above, the clamping force may change with the lapse of time due to thermal contraction of the members constituting each of the electric brake devices 24. When the operation of the parking brake is started, the temperatures of the members constituting each of the electric brake devices 24 may become high. If having thermally expanded, the members constituting each of the electric brake devices 24 discharge heat with the lapse of time, and the temperatures thereof fall. As a result, the members constituting each of the electric brake devices 24 thermally contract. At this time, the clamping force decreases or increases due to the thermally contracting members. It is difficult to predict changes in this clamping force, so the electric brake control apparatus 22 needs to monitor how the clamping force changes.

Figure 4:
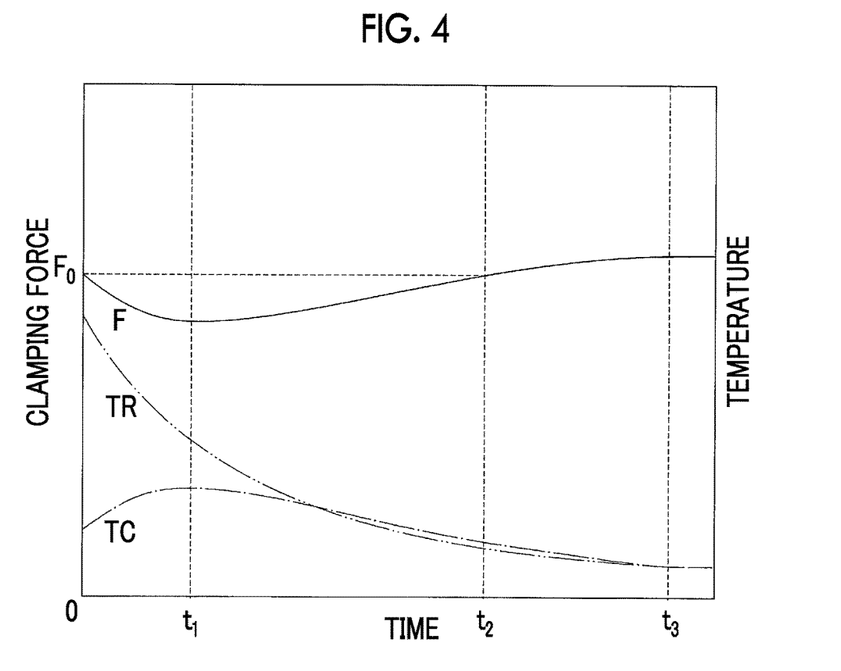
FIG. 4 is a view showing changes in a clamping force when the parking brake of the electric brake device according to the first embodiment of the disclosure is in operation.

FIG. 4 is a view showing how a caliper temperature TC, a brake rotor temperature TR, and a clamping force F change since the start of the operation of the parking brake. The axis of abscissa of FIG. 4 indicates the lapse of time, the left axis of ordinate of FIG. 4 indicates the magnitude of the clamping force, and the right axis of ordinate of FIG. 4 indicates the temperature. The brake rotor temperature TR gradually falls due to the discharge of heat after the parking brake is locked (at a time point O), and becomes constant at a time $t_3$. The speed at which heat resulting from the friction between the brake rotor 42 and the brake pads 28 is transferred to the caliper 26 is low. Therefore, the caliper temperature TC rises later than the temperature of the brake rotor 42. After rising due to the transfer of heat, the caliper temperature TC falls due to the discharge of heat, and becomes constant at the time $t_3$.

The clamping force F decreases along with thermal contraction of the brake rotor 42 due to a fall in the brake rotor temperature TR and thermal expansion of the caliper 26 due to a rise in the caliper temperature TC, from the start of the operation of the parking brake to a time $t_1$. The caliper temperature TC rises through the transfer of the heat of the brake rotor 42 to the caliper 26, and hence rises later than the temperature of the brake rotor 42. After the time $t_1$, both the brake rotor temperature TR and the caliper temperature TC fall, and the brake rotor 42 and the caliper 26 thermally contract. At this time, the amount of thermal contraction of the caliper 26 is larger than the amount of thermal contraction of the brake rotor 42, so a large force is applied to the piston 52. However, the piston 52 is locked by the lock pin 96, so the output cylinder 72 and the planetary rollers 76 do not move relatively to the input shaft 74. Accordingly, the clamping force F increases along with thermal contraction of the caliper 26. After that, the clamping force F becomes equal to a clamping force $F_0$ at the time when the operation of the parking brake is started, at a time $t_2$. After the time $t_2$ as well, the caliper 26 continues to thermally contract, so the clamping force F continues to increase, and becomes constant at the time $t_3$. The clamping force F at the time $t_3$ is larger than the clamping force $F_0$ at the time when the operation of the parking brake is started.

When the clamping force becomes large, the output cylinder 72 and the planetary rollers 76 do not move relatively to the input shaft 74, so the frictional force of regions where thread portions of the thread-like gear mechanism 92 of the linear motion conversion mechanism 50 are in contact with one another becomes large. The frictional force serves as a resistance in rotating the input shaft 74. Therefore, when the frictional force becomes large, the force that is needed to rotate the input shaft 74 becomes large in an attempt to move the piston 52 away from the brake pads 28. Therefore, the current that is supplied to the motor 46 also needs to be made large. However, the magnitude of the current that can be supplied to the motor 46 depends on the voltages of the battery 20 and the capacitor 32. Accordingly, when the clamping force becomes large, the cancellation of the operation of the parking brake may become impossible. In consideration of the characteristics of the clamping force F shown in FIG. 4, the electric brake control apparatus 22 carries out a clamping force monitoring control processing procedure from the start of the operation of the parking brake to the time $t_3$ when the caliper temperature TC and the brake rotor temperature TR become constant. That is, while monitoring the clamping force, the electric brake control apparatus 22 performs control such that the clamping force is confined between a lower-limit clamping force A and an upper-limit clamping force B.

The lower-limit clamping force A is a minimum clamping force that is needed to maintain a state where the parking brake is in operation and the brake rotor 42 is stopped. When the clamping force drops below the lower-limit clamping force A, the brake rotor 42 may become rotatable because the stopped state thereof cannot be maintained. The lower-limit clamping force A is calculated from an equation 1, using a gradient α of a road surface on which the vehicle is stopped, which is acquired from the signal of the G sensor 18. In the equation 1, an acceleration of gravity g, a definite integral $M_{GVW}$, a tire static load radius R, a brake effect BEF, a piston area C, and a braking effective radius r are used as constants.

$$A < \frac{g \cdot M_{GVW} \cdot R \cdot \sin\{(360/2\pi) \cdot \text{ATAN}(\alpha/100)\}}{2 \cdot BEF \cdot C \cdot r} \quad \text{[Equation 1]}$$

Figure 5:
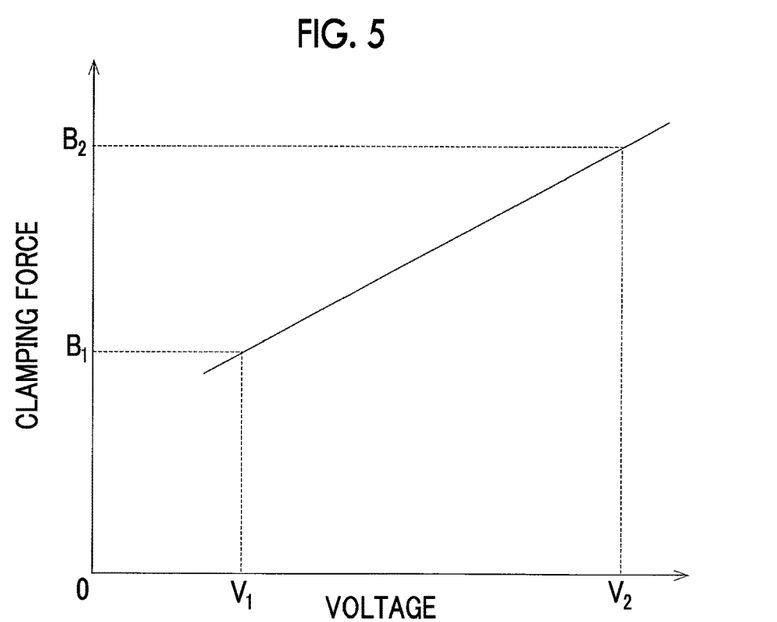
FIG. 5 is a view showing a relationship between a voltage of a voltage source of the electric brake device according to the first embodiment of the disclosure and an upper-limit clamping force.

Next, a method of calculating the upper-limit clamping force B will be described. FIG. 5 is a view showing a relationship between the voltage of the battery 20 and the magnitude of the clamping force that allows the operation of the parking brake to be cancelled with the aid of a force that is generated by the voltage. Both the battery 20 and the capacitor 32 have characteristics as shown in FIG. 5. The characteristic diagram of each of the battery 20 and the capacitor 32 is stored in advance in the electric brake control apparatus 22. The upper-limit clamping force B is set as a maximum value of a force that can be generated by the voltage of the battery 20 and that rotates the motor 46 in the second rotational direction. The second rotational direction is a rotational direction of the motor 46 in moving the piston 52 away from the brake pads 28. Accordingly, the upper-limit clamping force B is proportional to the voltage of the battery 20. The electric brake control apparatus 22 acquires the voltage of the battery 20, and determines an upper-limit clamping force $B_b$ for the voltage of the battery 20, referring to the characteristic diagram shown in FIG. 5. An upper-limit clamping force $B_c$ for the voltage of the capacitor 32 is also determined in the same manner. The larger one of the upper-limit clamping force $B_b$ and the upper-limit clamping force $B_c$ is adopted as the upper-limit clamping force B.

Figure 6:
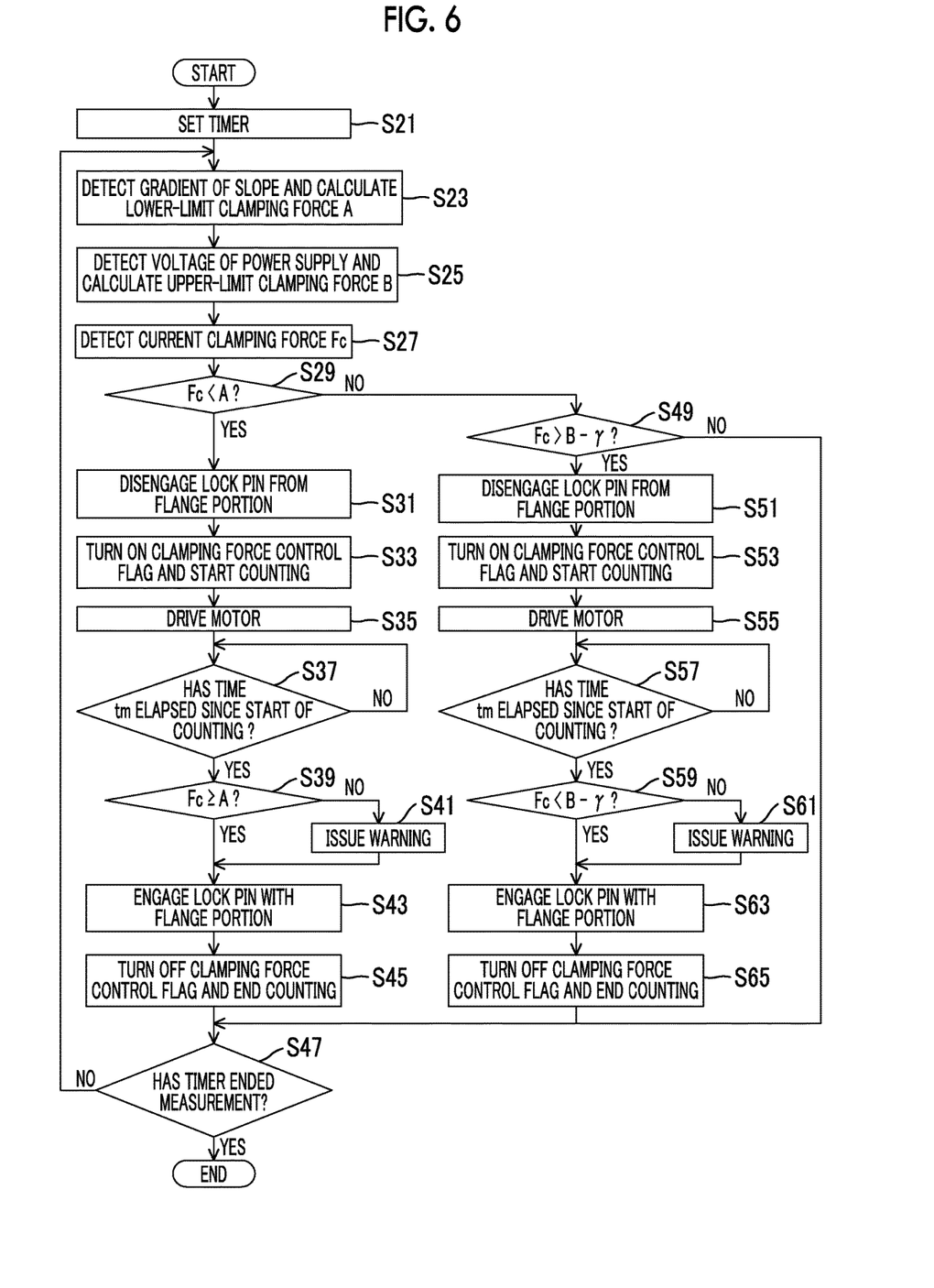
FIG. 6 is a view showing a processing procedure that is carried out by the electric brake control apparatus according to the first embodiment of the disclosure after the end of the processing procedure shown in FIG. 3.

FIG. 6 is a flowchart showing a clamping force control processing procedure that is carried out by the electric brake control apparatus 22. After the operation of the parking brake is performed by the passenger and the processing procedure according to the above-mentioned flowchart shown in FIG. 3 is ended, the electric brake control apparatus 22 starts the processing procedure according to the flowchart shown in FIG. 6. In S21, the electric brake control apparatus 22 starts a timer that measures a monitoring time of the clamping force F. Subsequently in S23, the electric brake control apparatus 22 calculates the gradient α of a road surface on which the vehicle is stopped, based on a signal of the G sensor 18, and estimates the lower-limit clamping force A using the equation 1. Then in S25, the electric brake control apparatus 22 detects voltages of the battery 20 and the capacitor 32, and calculates the upper-limit clamping force $B_b$ of the battery 20 and the upper-limit clamping force $B_c$ of the capacitor 32 based on the characteristic diagram shown in FIG. 5. The value of the larger one of the calculated upper-limit clamping forces $B_b$ and $B_c$ is adopted as the upper-limit clamping force B.

In S27, the electric brake control apparatus 22 acquires a current clamping force $F_c$ from a signal of the load sensor 56. Subsequently in S29, the electric brake control apparatus 22 determines whether or not the current clamping force $F_c$ acquired in S27 is smaller than the lower-limit clamping force A. If the current clamping force $F_c$ is smaller than the lower-limit clamping force A, the electric brake control apparatus 22 proceeds to S31. If the current clamping force $F_c$ is larger than the lower-limit clamping force A, the electric brake control apparatus 22 proceeds to S49, which will be described later. In S31, the electric brake control apparatus 22 supplies a current to the solenoid 94, and disengages the lock pin 96 from the flange portion 82. In S33, the electric brake control apparatus 22 turns a clamping force control start flag ON, and starts the counting by the counter. The counter is designed to measure a drive time of the motor 46.

In S35, the electric brake control apparatus 22 supplies a current, which is increased by a predetermined amount each time, to the motor 46 while monitoring the value of the load sensor 56. Thus, the motor 46 is rotated in the first rotational direction, and the piston 52 is moved to a position where the current clamping force $F_c$ is equal to or larger than the lower-limit clamping force A. In S37, the electric brake control apparatus 22 determines whether or not a time $t_m$ has elapsed since the start of the counting. The time $t_m$ is a time sufficient to move the piston 52 to a position where the current clamping force $F_c$ is equal to the lower-limit clamping force A. If the time $t_m$ has elapsed, the electric brake control apparatus 22 proceeds to S39. If the time $t_m$ has not elapsed, the electric brake control apparatus 22 repeats S37.

In S39, the electric brake control apparatus 22 determines, based on a signal of the load sensor 56, whether or not the current clamping force $F_c$ has become equal to or larger than the lower-limit clamping force A. If the current clamping force $F_c$ has become equal to or larger than the lower-limit clamping force A, the electric brake control apparatus 22 proceeds to S43. If the current clamping force $F_c$ is smaller than the lower-limit clamping force A, the electric brake control apparatus 22 proceeds to S41, issues a warning indicating that the braking force is insufficient, and then proceeds to S43. In S43, the electric brake control apparatus 22 stops supplying currents to the motor 46 and the solenoid 94, stops the motor 46 from being driven, and engages the lock pin 96 with the flange portion 82. In S45, the electric brake control apparatus 22 turns the clamping force control flag OFF, and ends the counting of control. Subsequently in S47, the electric brake control apparatus 22 determines whether or not the time of the timer that started measurement in S21 has exceeded the time $t_3$ and the timer has ended measurement. If the timer has not ended measurement, the electric brake control apparatus 22 returns to S23. If the timer has ended measurement, the electric brake control apparatus 22 ends the clamping force monitoring control processing procedure according to the flowchart.

If it is determined in S29 that the current clamping force $F_c$ is larger than the lower-limit clamping force A, the electric brake control apparatus 22 proceeds to S49. In S49, the electric brake control apparatus 22 determines whether or not the current clamping force $F_c$ is larger than a calculated value (B–γ) that is obtained by subtracting a constant γ as a margin from the upper-limit clamping force B. If the current clamping force $F_c$ is larger than the calculated value (B–γ), the electric brake control apparatus 22 proceeds to S51. If the current clamping force $F_c$ is smaller than the calculated value (B–γ), the electric brake control apparatus 22 proceeds to S47. In S51, the electric brake control apparatus 22 supplies a current to the solenoid 94, and separates the lock pin 96 from the flange portion 82. In S53, the electric brake control apparatus 22 turns the clamping force control start flag ON, and starts the counting by the counter. In S55, the electric brake control apparatus 22 supplies a current, which is reduced by a predetermined amount each time, to the motor 46 while monitoring the value of the load sensor 56. Thus, the motor 46 is rotated in the second rotational direction, and the piston 52 is moved to a position where the current clamping force $F_c$ becomes smaller than the upper-limit clamping force B–γ.

Subsequently in S57, the electric brake control apparatus 22 determines whether or not the time $t_m$ has elapsed since the start of the counting. If the time $t_m$ has elapsed, the electric brake control apparatus 22 proceeds to S59. If the time $t_m$ has not elapsed, the electric brake control apparatus 22 repeats S57. In S59, the electric brake control apparatus 22 determines whether or not the current clamping force $F_c$ is smaller than the upper-limit clamping force B–γ. If the current clamping force $F_c$ is smaller than the upper-limit clamping force B–γ, the electric brake control apparatus 22 proceeds to S63. If the current clamping force $F_c$ is larger than the upper-limit clamping force B–γ, the electric brake control apparatus 22 proceeds to S63 after issuing a warning indicating that the braking force cannot be canceled in S61. In S63, the electric brake control apparatus 22 stops supplying currents to the motor 46 and the solenoid 94, stops the motor 46 from being driven, and engages the lock pin 96 with the flange portion 82. In S65, the electric brake control apparatus 22 turns the clamping force control flag OFF. Subsequently, the electric brake control apparatus 22 proceeds to S47. If the timer has not ended measurement, the electric brake control apparatus 22 returns to S23. If the timer has ended measurement, the electric brake control apparatus 22 ends the clamping force monitoring control processing procedure according to the flowchart.

As described above, in the present embodiment of the disclosure, when the parking brake is operated, rotation of the flange portion 82 is not allowed by the lock pin 96, so the clamping force F increases by a value corresponding to thermal contraction of the caliper 26. When the clamping force F increases, the frictional force in regions of contact between the planetary thread portions 90 and the input thread portion 88 increases, and the force that is needed to rotate the input shaft 74 increases. The force that is needed to rotate the input shaft 74 depends on the power that can be supplied to the motor 46 by the power supply. Accordingly, when the clamping force F increases and the force that is needed to rotate the input shaft 74 becomes larger than the force that is generated by the power supply, it may become impossible to cancel the operation of the parking brake.

To prevent this possibility, in the present embodiment of the disclosure, the electric brake control apparatus 22 monitors the clamping force from the start of the operation of the parking brake to the time $t_3$ when the clamping force stops changing. Thus, an increase in the clamping force as well as a decrease in the clamping force resulting from thermal contraction of the electric brake devices 24 during the operation of the parking brake can be detected. Besides, during the monitoring of the clamping force, the clamping force F is increased when the current clamping force $F_c$ drops below the lower-limit clamping force A, and the clamping force F is reduced when the current clamping force $F_c$ may exceed the upper-limit clamping force B. Thus, the clamping force F can be controlled so as not to become larger than the force that can be generated by the voltage of the power supply, while being held equal to such a magnitude that the brake rotor 42 does not rotate. Accordingly, rotation of the brake rotor 42 through a decrease in the clamping force F, and the cancellation of the operation of the parking brake through an increase in the clamping force F can be prevented from becoming impossible.

The voltages of the battery 20 and the capacitor 32 according to the first embodiment of the disclosure are an example of the state of the power supply. The electric brake control apparatus 22 that carries out S27 is an example of the clamping force acquisition unit. The input shaft 74 is an example of the first member. The output cylinder 72 and the planetary rollers 76 are an example of the second member. The first rotational direction is a rotational direction of the motor 46 in moving the piston 52 toward the brake pads 28. The second rotational direction is a rotational direction of the motor 46 in moving the piston 52 away from the brake pads 28. The electric brake control apparatus 22 that carries out S23 is an example of the lower-limit clamping force acquisition unit. The electric brake control apparatus 22 that carries out S25 is an example of the upper-limit clamping force acquisition unit. The electric brake control apparatus 22 that carries out S29 to S45 and S49 to S65 is an example of the clamping force control unit.

Incidentally, although the aspect of the disclosure has been described above, the electric brake system 2 including the electric brake control apparatus 22 according to the disclosure is not limited to the foregoing aspect of the disclosure, but can be subjected to various alterations within such a range as not to depart from the gist of the disclosure.

As described above, in the present embodiment of the disclosure, the processing procedure that is carried out by the electric brake control apparatus 22 to monitor the clamping force is carried out when the parking brake is operated, but the disclosure is not limited thereto. For example, this processing procedure may be carried out when the vehicle is stopped with the brake pads 28 pressed against the brake rotor 42 through, for example, the operation of the service brake. Besides, in the present embodiment of the disclosure, the planetary gear mechanism is used as the linear motion conversion mechanism 50, but the disclosure is not limited thereto. For example, a mechanism that is constituted of a screw and a nut may be used as the linear motion conversion mechanism 50. Besides, in the present embodiment of the disclosure, the processing procedure of monitoring the clamping force includes the step in which the lock pin 96 is engaged with the flange portion 82, but the disclosure is not limited thereto. For example, when the linear motion conversion mechanism 50 that is designed such that the reverse efficiency of the thread-like gear mechanism 92 is 0 or a negative value when the output side (the piston) is viewed from the input side (the motor) is used, the configuration regarding the lock pin 96 may be removed from the electric brake system 2, and the above-mentioned step may be omitted. Besides, in the present embodiment of the disclosure, the upper-limit clamping force B is calculated from the characteristic diagram of the voltage of the power supply and the upper-limit clamping force B, but the disclosure is not limited thereto. For example, the upper-limit clamping force B may be calculated from a characteristic diagram of the current value of the power supply and the upper-limit clamping force B.

What is claimed is:

1. An electric brake control apparatus comprising:
    a first clamping force acquisition unit that is configured to acquire a clamping force, the clamping force being a force generated by moving a piston toward a pad through rotation of a motor in a first rotational direction to press the pad against a rotor;
    a lower-limit clamping force acquisition unit that is configured to acquire a lower-limit clamping force, the lower-limit clamping force being a minimum value of the clamping force required to maintain a stopped state of the rotor;
    an upper-limit clamping force acquisition unit that is configured to acquire, based on a state of a power supply, an upper-limit clamping force, the upper-limit clamping force being a maximum value of the clamping force that is enough to move the piston away from the pad through a power of the power supply while maintaining the stopped state of the rotor; and
    a clamping force control unit that is configured to control the motor such that the clamping force acquired by the first clamping force acquisition unit is confined between the lower-limit clamping force and the upper-limit clamping force.

2. The electric brake control apparatus according to claim 1, wherein
    the first clamping force acquisition unit includes a load sensor configured to detect, as the clamping force, a force that is applied to the piston from the pad when the pad is pressed against the rotor through rotation of the motor in the first rotational direction.

3. The electric brake control apparatus according to claim 2, wherein
    the load sensor is supported by a caliper that supports the pad,
    the force applied to the piston from the pad is transmitted to the load sensor from the piston via a linear motion conversion mechanism, and
    the linear motion conversion mechanism is equipped with a first member and a second member, the first member being configured to be rotated by the motor, and the second member being configured to move the piston by moving toward or away from the pad through rotation of the first member.

4. The electric brake control apparatus according to claim 3, wherein
    the second member is configured not to move relatively to the first member in a state where no power is supplied to the motor from the power supply.

5. The electric brake control apparatus according to claim 1, wherein
    the upper-limit clamping force acquisition unit is configured to acquire the upper-limit clamping force based on an amount of power stored by the power supply.

6. The electric brake control apparatus according to claim 1, wherein
    the upper-limit clamping force acquisition unit is configured to acquire the upper-limit clamping force that is larger when an amount of power stored by the power supply is large than when the amount of power stored by the power supply is small.

7. The electric brake control apparatus according to claim 1, further comprising:
    a detection sensor configured to detect an activation of a parking brake, wherein
    the electric brake control apparatus is configured to stop acquisition of the lower-limit clamping force by the lower-limit clamping force acquisition unit, acquisition of the upper-limit clamping force by the upper-limit clamping force acquisition unit, and performance of control of the motor by the clamping force control unit, after a predetermined period from the activation of the parking brake.

8. The electric brake control apparatus according to claim 1, wherein
    the clamping force control unit is configured to release a lock mechanism while controlling the motor, the lock mechanism being configured to activate through the activation of the parking brake, and, to keep the piston from moving away from the pad.

* * * * *